J. E. RUNNER & W. A. PFISTERER.
DRY CELL.
APPLICATION FILED AUG. 4, 1913.

1,112,480.

Patented Oct. 6, 1914.

Witnesses

Joseph E. Runner and
William A. Pfisterer
Inventors,
by
Attorneys

UNITED STATES PATENT OFFICE.

JOSEPH E. RUNNER AND WILLIAM A. PFISTERER, OF DUNKIRK, INDIANA.

DRY CELL.

1,112,480.  Specification of Letters Patent.  Patented Oct. 6, 1914.

Application filed August 4, 1913. Serial No. 782,933.

*To all whom it may concern:*

Be it known that we, JOSEPH E. RUNNER and WILLIAM A. PFISTERER, citizens of the United States, residing at Dunkirk, in the county of Jay, State of Indiana, have invented a new and useful Dry Cell, of which the following is a specification.

The present invention relates to improvements in dry cells, one object of the present invention being the provision of a dry cell in which the component parts are so arranged, that a uniform consumption of the chemicals is attained, thereby increasing the life of the cell and maintaining its maximum efficiency during the entire life thereof.

A further object of the present invention is the production of a dry cell, in which the carbon or negative electrode, is disposed within the electrolyte within the cell and is completely surrounded thereby, thus preventing the exposure of such porous body to the atmosphere, there being further provided means for sealing the electrolyte that is capable of evaporation so that the moisture therewithin is retained for a greater period and therefore the maximum efficiency of the cell is increased and the period of utilization prolonged.

A still further object of the present invention, is the provision of a dry cell in which evaporation is prevented, thereby holding the cell against deterioration either in or out of service and preventing the same from drying from the top downward as is the usual trouble with dry cells, this particular structure of cell therefore decreasing the higher resistance at the upper end of a negative electrode due to such drying and thus maintaining the electrolyte throughout the full length of the negative electrode so that there are no "dead" spots within the cell.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

Figure 1:
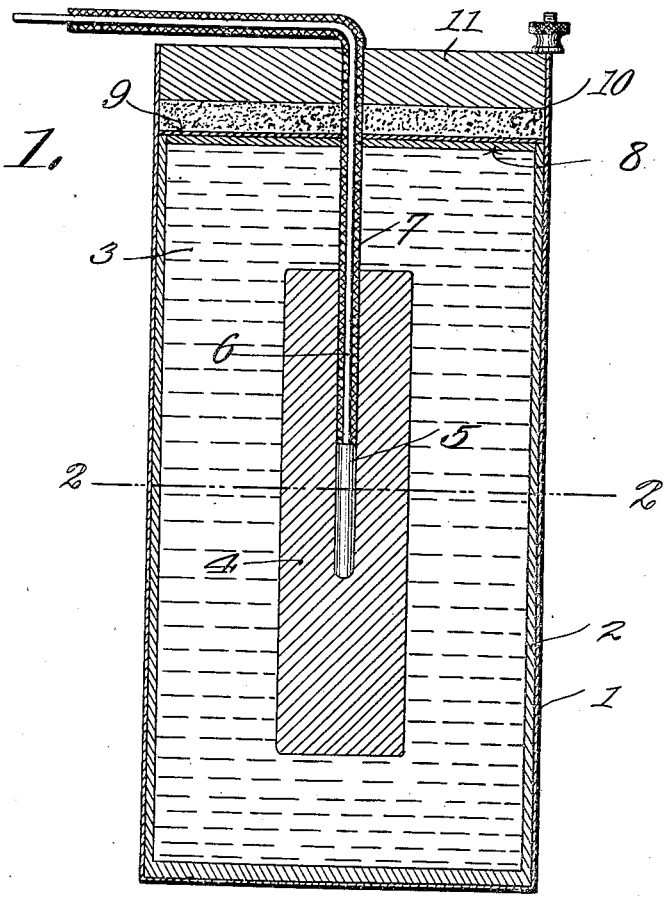
Figure 2:
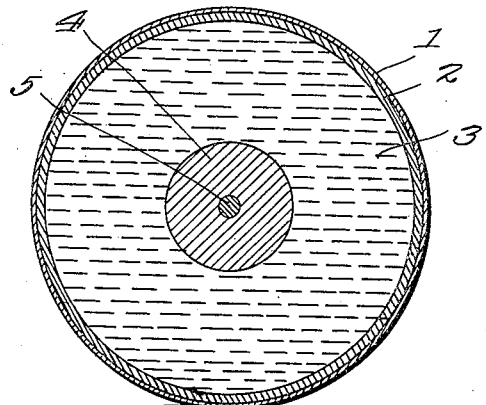

In the drawings Figure 1 is a vertical central sectional view through a dry cell constructed according to and embodying the present invention. Fig. 2 is a section taken on line 2—2 of Fig. 1.

Referring to the drawings, the numeral 1 designates the outer casing which is the positive electrode of the dry cell, the same being preferably composed of zinc and in the present instance shown as a hollow cylindrical member with the bottom sealed. Disposed within the same and lining the bottom and wall thereof, is a bibulous lining 2, which is of the usual material producing a spongy lining for the zinc cup 1, the bottom thereof being double the thickness of the side wall of the lining.

The electrolyte 3, which is intermixed with an inert material forming a semi-solid mass adapted to retain the liquid electrolyte in suspension as is the usual custom, is placed within the bibulous lining 2 and disposed centrally of the electrolyte 3 and having its ends terminate, equally spaced above the bottom and below the top respectively of such electrolyte 3, is the negative electrode 4, preferably made of carbon and formed in the shape of a cylinder. Disposed within the negative electrode 4 axially thereof and at a point intermediate of the respective upper and lower ends, is a metal contact 5, whose terminal 6 is disposed within the sleeve 7 which is of the usual porous fiber insulation and extends upwardly and exteriorly of the upper end of the cell, as clearly illustrated in Fig. 1. Thus the insulation 7 forms a vent for the gas evolved during the chemical action of the battery cell. The upper end of the terminal 6 constitutes the negative terminal of the cell.

Fitted over the upper body of the electrolyte 3 and within the bibulous lining 2, is a disk 8 of the same material as the lining 2, while disposed above the disk 8 and in contact with the adjacent portion of the cup 1 is a disk 9 of the positive electrode, said disk being composed of the identical material that the cup 1 is composed of and being spaced equally from the upper end of the negative electrode 4 as the bottom of the cup 1.

Placed upon the upper surface of the disk 9 is a packing 10 of an insulating material, in the present instance preferably sand or fiber, the usual sealing compound 11 being disposed to seal the upper end of the cup 1 and thus hermetically seal the cell so that there is no danger of evaporation at the contact portion with the upper end of the cup 1 and the portion surrounding the insulation 7. The outer surface of this insulation being slightly porous, forms an avenue of escape for evolved gas from the carbon electrode.

From the foregoing description, it is evident that with a dry cell constructed as above set forth, the negative electrode 4 preferably composed of carbon, which as well known is porous, is maintained properly wet or moist at all times due to the fact that the upper end terminates within the electrolyte 3 and does not project exteriorly of the sealing portion 11, as is customary. By this means, the uniform chemical action of all forces is maintained throughout the full length of the negative electrode 4, and as the moisture is retained within the dry cell for the longest possible period, the life of the cell both when in use and out of use is increased, and the maximum efficiency both as to voltage and amperage is maintained. The pulverized electrolyte 3 is as usual composed of an inert material mixed with a solution of salammoniac, or bichlorate of potash and sulfuric acid, or any usual composition used for filling dry cells and it has been found that the zinc container 1 may be made of any size and shape, and due to the hermetically sealed package which prevents to a great degree the evaporation of the moisture within the chemical electrolyte, the battery of a smaller size will be as efficient as the usual form of dry cell made much larger.

It is to be noted that the negative electrode 4 is hermetically sealed within the electrolyte and by so doing a uniform induction is maintained and by reason of the fact that the lead 6 is insulated from the electrolyte, it is properly hermetically sealed even at the point of projection exteriorly of the sealing composition 11, the terminal thereof being made of any length and preferably of such a length as to readily engage the binding post of the positive electrode of an adjacent cell. It has also been found that a dry cell constructed according to the present invention is water proof, and may be exposed to the atmosphere and be unaffected by water, as the negative electrode, as before stated, is hermetically sealed and is therefore unaffected by any water that would affect the usual projecting end of the negative electrode of the ordinary dry cell.

What is claimed is:

1. A dry cell, having a positive member, the greater portion of which is the container, an electrolyte mounted therein, a negative electrode submerged within the electrolyte with its upper end below the upper surface of the electrolyte, an insulated conductor leading from the negative electrode through the electrolyte and exteriorly of the container, a metal disk disposed upon the upper surface of the electrolyte and contacting at its periphery with the container, the container and the disk forming the positive electrode, and a hermetical seal filling the upper end of the container above said disk.

2. A dry cell, including a metal receptacle comprising the positive electrode, a porous lining therefor extending to a point near the top thereof, an electrolyte filling the receptacle to the upper edge of the porous lining, a negative electrode disposed to be surrounded by the electrolyte and having its upper end terminate at a point below the upper surface of the active material, an insulated combined conductor and terminal connection for the negative electrode connected to the negative electrode and extending through the electrolyte, a coating of porous material mounted upon the upper surface of the electrolyte, a metal disk fitted upon the last mentioned lining and in contact with the positive electrode to form a portion thereof, and a hermetical seal above the last mentioned disk and within the upper end of the receptacle.

3. A dry cell, including a metal receptacle comprising the positive electrode, a porous lining therefor extending to a point near the top thereof, an electrolyte filling the receptacle to the upper edge of the porous lining, a negative electrode disposed to be surrounded by the electrolyte and having its upper end terminate at a point below the upper surface of the electrolyte, an insulated combined conductor and terminal connection for the negative electrode connected to the negative electrode and extending through the active material, a coating of porous material mounted upon the upper surface of the electrolyte, a metal disk fitted upon the last mentioned lining and in contact with the positive electrode to form a portion thereof, a hermetical seal above the last mentioned disk and within the upper end of the receptacle, and a granular packing between the metal disk and the hermetical seal.

4. A dry cell, having a positive electrode forming the receptacle, an electrolyte therein, a negative electrode submerged within the electrolyte and having its upper end terminating at a point below the upper surface thereof, a piece of bare metal disposed within the negative electrode at a point equidistant from the ends and axially thereof, a lead contacting and extending from the metal piece and projecting exteriorly of the positive electrode, an insulating coating for said lead extending from a point within the negative electrode to a point exteriorly of the upper end of the positive electrode, the terminal of the lead being exposed and constituting a connecting terminal for an adjacent cell, and a metal disk fitting within and containing the wall of the receptacle and forming with the receptacle a surrounding positive electrode to contain the electrolyte and the negative electrode, the lead being extended through the disk.

5. A dry cell, having a positive electrode container, an electrolyte therein, a negative electrode suspended within the electrolyte with the material beyond both ends thereof, a bare conductor leading centrally from the negative electrode and exteriorly of the container and constituting the negative terminal, insulating material surrounding the conductor from a point within the negative electrode and through the electrolyte, a metal plate covering the electrolyte and contacting to form with the container an inclosing positive electrode, and a hermetical seal above the metal plate and in the container.

In testimony that we claim the foregoing as our own, we have hereto affixed our signatures in the presence of two witnesses.

JOSEPH E. RUNNER.
WILLIAM A. PFISTERER.

Witnesses:
WILLIAM O. MOORE,
MICHAEL STONDT.